(12) United States Patent
Kucuk et al.

(10) Patent No.: US 9,179,366 B2
(45) Date of Patent: Nov. 3, 2015

(54) SCHEDULING METHODS AND APPARATUS BASED ON ADJUSTED CHANNEL CAPACITY

(75) Inventors: Noy C. Kucuk, Calgary (CA); Chengzhou Li, Whitehall, PA (US); Jinhui Li, Macungie, PA (US); Evstratios Vandris, Worcester, PA (US)

(73) Assignee: Intel Corporation, Santa Clara, CA (US)

( * ) Notice: Subject to any disclaimer, the term of this patent is extended or adjusted under 35 U.S.C. 154(b) by 2809 days.

(21) Appl. No.: 11/468,917

(22) Filed: Aug. 31, 2006

(65) Prior Publication Data

US 2008/0056296 A1 Mar. 6, 2008

(51) Int. Cl.
*H04W 28/14* (2009.01)
*H04L 12/54* (2013.01)
*H04L 12/863* (2013.01)

(52) U.S. Cl.
CPC ............ *H04W 28/14* (2013.01); *H04L 12/5693* (2013.01); *H04L 47/6255* (2013.01)

(58) Field of Classification Search
USPC ......... 370/314, 319, 321–323, 325–326, 329, 370/336, 337, 345–350, 395.4–395.43, 370/412–418, 429, 431, 442–444, 458–459, 370/462, 464, 498–499, 537–541
See application file for complete search history.

(56) References Cited

U.S. PATENT DOCUMENTS

| | | | | |
|---|---|---|---|---|
| 4,698,672 | A * | 10/1987 | Chen et al. | 375/240.12 |
| 6,279,158 | B1 * | 8/2001 | Geile et al. | 725/126 |
| 6,385,168 | B1 * | 5/2002 | Davis et al. | 370/230 |
| 6,445,707 | B1 * | 9/2002 | Iuoras et al. | 370/395.43 |

(Continued)

FOREIGN PATENT DOCUMENTS

| | | |
|---|---|---|
| EP | 1154665 | 11/2001 |
| EP | 1257096 | 11/2002 |
| WO | 9845966 | 10/1998 |
| WO | 2004047379 | 6/2004 |
| WO | PCTUS200706221 | 7/2007 |

OTHER PUBLICATIONS

Kwan, R.; Chong, P.H.J.; Poutiainen, E.; Rinne, M., "The effect of code-multiplexing on the high speed downlink packet access (HSDPA) in a WCDMA network," Wireless Communications and Networking, 2003. WCNC 2003. 2003 IEEE , vol. 3, no., pp. 1728-1732 vol.3, Mar. 20-20, 2003 URL: http://ieeexplore.ieee.org/stamp/stamp.jsp?arnumber=1200648&isnumber=270.*

(Continued)

*Primary Examiner* — Hassan Kizou
*Assistant Examiner* — Ashil Farahmand
(74) *Attorney, Agent, or Firm* — Schwabe, Williamson & Wyatt, P.C.

(57) ABSTRACT

A scheduler having improved throughput is disclosed, for scheduling packets or other data blocks for transmission from a plurality of transmission elements in timeslots in a communication system. The scheduler determines for the transmission elements respective channel capacities, and adjusts one or more of the channel capacities based on amounts of data available to transmit in the corresponding transmission elements. The scheduler then selects one or more of the transmission elements for scheduling in a given one of the timeslots based on the one or more adjusted channel capacities. The scheduler in an illustrative embodiment may be implemented in a network processor integrated circuit or other processing device of the communication system.

23 Claims, 4 Drawing Sheets

(56) References Cited

U.S. PATENT DOCUMENTS

| | | | |
|---|---|---|---|
| 6,477,144 B1* | 11/2002 | Morris et al. | 370/230.1 |
| 6,912,225 B1* | 6/2005 | Kohzuki et al. | 370/412 |
| 7,418,007 B1* | 8/2008 | Liu et al. | 370/468 |
| 2002/0133589 A1* | 9/2002 | Gubbi et al. | 709/225 |
| 2004/0120258 A1 | 6/2004 | Mattila | |
| 2005/0094643 A1* | 5/2005 | Wang et al. | 370/395.4 |
| 2005/0111461 A1 | 5/2005 | Khan et al. | |
| 2006/0026192 A1 | 2/2006 | Li et al. | |
| 2006/0117054 A1 | 6/2006 | Li et al. | |

OTHER PUBLICATIONS

Wikipedia., Integrated Circuit. Aug. 29, 2005. http://web.archive.org/web/20050829003826/http://en.wikipedia.org/wiki/Integrated_circuit.*

U.S. Appl. No. 11/461,181, filed Jul. 31, 2006, Jinhui Li, "High-Throughput Scheduler with Integer-Based Eligible Number Initialization."

U.S. Appl. No. 11/427,476, filed Jun. 29, 2006, Jinhui Li, "Credit-Based Wireless Network Scheduling."

U.S. Appl. No. 11/415,831, filed May 1, 2006, C.W. Hamilton et al., "Wireless Network Scheduling Methods and Apparatus Based on Both Waiting Time and Occupancy."

U.S. Appl. No. 11/415,546, filed May 1, 2006, C.W. Hamilton et al., "High-Throughpuy Scheduler with Guaranteed Fairness for Wireless Networks and Other Applications."

A. Jalali et al., "Data Throughput of CDMA-HDR a High Efficiency-High Data Rate Personal Communication Wireless System," Proceedings of IEEE VTC 2000, pp. 1854-1858, May 2000.

S.S. Panwar et al., "Golden Ratio Scheduling for Flow Control with Low Buffer Requirements," IEEE Transactions on Communications, vol. 40, No. 4, pp. 765-772, Apr. 1992.

M. Andrews et al., "Providing Quality of Service Over a Shared Wireless Link," IEEE Communication Magazine, vol. 39, pp. 150-154, Feb. 2001.

* cited by examiner

SCHEDULING METHODS AND APPARATUS BASED ON ADJUSTED CHANNEL CAPACITY

RELATED APPLICATIONS

The present application is related to U.S. patent application Ser. No. 11/415,831, filed May 1, 2006 and entitled "Wireless Network Scheduling Methods and Apparatus Based on Both Waiting Time and Occupancy," Ser. No. 11/415,546, filed May 1, 2006 and entitled "High-Throughput Scheduler with Guaranteed Fairness for Wireless Networks and Other Applications," Ser. No. 11/427,476, filed Jun. 29, 2006 and entitled "Credit-Based Wireless Network Scheduling," and Ser. No. 11/461,181, filed Jul. 31, 2006 and entitled "High-Throughput Scheduler with Integer-Based Eligible Number Initialization," the disclosures of which are incorporated by reference herein.

FIELD OF THE INVENTION

The present invention relates generally to the field of telecommunications, and more particularly to schedulers used to control access to limited resources.

BACKGROUND OF THE INVENTION

In many telecommunications applications, a scheduler is used to resolve contention among multiple tasks competing for a limited resource. For example, such a scheduler is commonly used in a network processor to schedule multiple traffic flows for transmission over a specific transmission bandwidth.

A network processor generally controls the flow of data between a physical transmission medium, such as a physical layer portion of a network, and a switch fabric in a router or other type of switch. An important function of a network processor involves the scheduling of cells, packets or other data blocks, associated with the multiple traffic flows, for transmission to the switch fabric from the physical transmission medium of the network and vice versa. The network processor scheduler performs this function.

An efficient and flexible scheduler architecture capable of supporting multiple scheduling algorithms is disclosed in U.S. patent application Ser. No. 10/722,933, filed Nov. 26, 2003 in the name of inventors Asif Q. Khan et al. and entitled "Processor with Scheduler Architecture Supporting Multiple Distinct Scheduling Algorithms," which is commonly assigned herewith and incorporated by reference herein.

It is often desirable for a given scheduling algorithm implemented in a network processor or other processing device to be both simple and fair. Simplicity is important because the processing device hardware typically does not have a large amount of time to make a given scheduling decision, particularly in a high data rate environment. A good scheduler should also be fair. For example, it may allocate the bandwidth according to the weights of the users, with the higher-priority users getting more bandwidth than lower-priority users.

An example of a simple and fair scheduling algorithm is the Weighted Round-Robin (WRR) scheduling algorithm. Assume that in a given telecommunications application there is a number of users competing for one resource, which can process one data block in each timeslot. The scheduler must decide which user can send one data block to the server in each timeslot. Each user has a weight to indicate its priority. The user with larger weight has higher priority. Under ideal conditions, the services received by the users should be proportional to their weights. A WRR scheduler serves the users in proportion to their weights in a round-robin fashion.

A problem with WRR is that it may cause long periods of burstiness. This is clearly not desirable in telecommunication systems, because long burstiness could overflow the buffers of user communication devices. Such burstiness becomes increasingly problematic in those practical applications in which the total number of users may be several hundreds or more.

Alternative scheduling algorithms are known which overcome the burstiness problem of WRR. These include, by way of example, Weighted Fair Queuing (WFQ) and Worst-case Fair Weighted Fair Queueing (WF$^2$Q). Unfortunately, these alternative algorithms are typically considerably more complex than WRR, and therefore may be difficult to implement in network processors and other processing devices operating in high data rate environments.

U.S. patent application Ser. No. 10/903,954, filed Jul. 30, 2004 in the name of inventors Jinhui Li et al. and entitled "Frame Mapping Scheduler," which is commonly assigned herewith and incorporated by reference herein, discloses in an illustrative embodiment a frame mapping scheduler that provides simplicity and fairness comparable to that of WRR, but without the burstiness problem commonly associated with WRR. More specifically, a frame mapping scheduler in the illustrative embodiment described therein comprises scheduling circuitry which utilizes a weight table and a mapping table. The weight table comprises a plurality of entries, with each of the entries identifying a particular one of the transmission elements. The mapping table comprises at least one entry specifying a mapping between a particular timeslot of a frame and an entry of the weight table. The scheduling circuitry determines a particular transmission element to be scheduled in a given timeslot by accessing a corresponding mapping table entry and utilizing a resultant value to access the weight table. The mapping table entries may be predetermined in accordance with a golden ratio policy, or other type of policy.

However, in schedulers which utilize a golden ratio policy, or more generally any policy that requires a stored mapping table, the mapping table may be large and therefore require substantial amounts of memory. It is usually preferred that such mapping table memory be arranged "on-chip," that is, on the same integrated circuit as the scheduler, so as to reduce access times. For example, such an arrangement is beneficial in network processing applications in which data blocks may need to be processed substantially in real time.

U.S. patent application Ser. No. 10/998,686, filed Nov. 29, 2004 in the name of inventors Jinhui Li et al. and entitled "Frame Mapping Scheduler with Compressed Mapping Table," discloses techniques for compressing the mapping table in order to reduce the amount of memory required to store the table, thereby facilitating its implementation in a network processor integrated circuit or other device comprising a frame mapping scheduler.

The known arrangements described above can be utilized in a wide variety of telecommunications applications, including applications involving wireless networks. However, scheduling in the wireless network context can be particularly challenging because channel capacities in a wireless network are typically time varying and difficult to predict. It is important in such situations that the wireless network scheduler provides not only fairness, but also sufficient throughput.

Examples of scheduling algorithms utilized in the wireless network context include the above-described WRR scheduling algorithm and its unweighted counterpart round robin (RR), maximum carrier-to-interference ratio (Max C/I), Proportional Fairness (PF) and Modified Largest Weighted Delay First (M-LWDF).

A drawback of the RR scheduling algorithm is that it does not consider the channel conditions. Instead, the RR scheduling algorithm simply schedules backlogged users one by one, with the first user being assigned to the first timeslot, the second user being assigned to the second timeslot, and so on, regardless of their respective channel capacities. Such an approach is fair, because in a given set of N timeslots, each of N users has exactly one chance to be served. However, the throughput of the RR algorithm is poor, because it does not check the channel capacities before it makes the scheduling decisions. The WRR scheduling algorithm similarly fails to take channel capacities into account in its scheduling decisions.

The Max C/I scheduling algorithm selects for a given timeslot the user that has the best channel capacity. Although this approach can achieve the maximum overall throughput, its fairness performance is very poor. For example, if the wireless link of a given mobile user is constantly weak, that user is not likely to be scheduled.

The PF scheduling algorithm selects the user that has the maximum $r_i/R_i$, where $r_i$ is the channel capacity of user i and $R_i$ is the average rate received by user i. The algorithm updates $R_i$ adaptively. Thus, mobile users with weak wireless links will have opportunities to be scheduled. Additional details regarding the PF scheduling algorithm can be found in, for example, A. Jalali et al., "Data throughput of CDMA-HDR a high efficiency high data rate personal communication wireless system," in Proc. of IEEE VTC 2000, pp. 1854-1858, May 2000. The fairness of the PF scheduling algorithm is better than that of the Max C/I scheduling algorithm, but not as good as that of the RR or WRR scheduling algorithms. Also, the PF scheduling algorithm cannot provide guaranteed fairness.

The M-LWDF scheduling algorithm gives higher priorities to the users that have longer waiting times. However, like the above-described PF scheduling algorithm, it fails to provide guaranteed fairness.

Accordingly, the Max C/I, PF and M-LWDF scheduling algorithms provide better throughput than the RR and WRR scheduling algorithms in the wireless context by sacrificing fairness.

The above-cited U.S. patent application Ser. No. 11/415,546 provides improved scheduling algorithms which exhibit a better balance between throughput and fairness, particularly in wireless network applications. In an illustrative embodiment, the algorithm is referred to as a Wireless RR (WiRR) scheduling algorithm. In this embodiment, all transmission elements are initially designated as eligible for service in a given frame, but once a particular transmission element is served in a timeslot of the given frame, it is considered ineligible for service in any subsequent timeslots of that frame. The process is repeated for additional frames, and for each new frame the transmission elements are all initially designated as eligible to transmit one or more data blocks in that frame.

Further improvements are provided in the above-cited U.S. patent application Ser. No. 11/415,831, which overcomes certain disadvantages of the conventional M-LWDF scheduling algorithm. For example, the M-LWDF algorithm generally has a queue length which, although bounded under admissible arrivals, may be quite large, and therefore the queues may be difficult to implement in network processor integrated circuits or other types of hardware. The cited application discloses scheduling algorithms that can be implemented using shorter queues, and thus with reduced amounts of memory and other hardware resources, relative to conventional scheduling algorithms such as M-LWDF.

The scheduling algorithms described in the above-cited U.S. patent application Ser. No. 11/461,181 can provide improved throughput relative to a WiRR scheduling algorithm through the use of integer-based initialization of eligible numbers. The eligible numbers are initialized using a common designated integer value n, where n is a finite value greater than or equal to two. In one embodiment, an n-Wireless RR (n-WiRR) scheduling algorithm is disclosed. Eligible numbers $e_i$ for all of N eligible users in this embodiment are initialized by setting them equal to the integer value n, that is, by setting $e_i=n$ for all i. In this particular embodiment, whenever a user is served, its eligible number decreases by one. When the eligible number reaches zero, that user is ineligible for any further consideration in the given frame. As indicated previously, such an approach can improve throughput relative to a WiRR algorithm.

Despite these advances, a need remains for further improvements in scheduling algorithms, particularly in the wireless context. For example, certain of the above-noted algorithms make use of channel capacity measures in making scheduling decisions. In some instances, the channel capacity measures may not accurately reflect the throughput that can be achieved by the corresponding users. This may occur, for example, in a situation in which a particular user has a high channel capacity but a short queue length. The overall throughput of the system may be adversely impacted by scheduling such users based on conventional channel capacity measures.

SUMMARY OF THE INVENTION

The present invention in one or more illustrative embodiments provides wireless scheduling algorithms that exhibit improved throughput relative to one or more of the above-noted conventional scheduling algorithms.

In accordance with one aspect of the invention, a scheduler is adapted to schedule packets or other data blocks for transmission from a plurality of transmission elements in timeslots in a communication system. The scheduler determines for the transmission elements respective channel capacities, and adjusts one or more of the channel capacities based on amounts of data available to transmit in the corresponding transmission elements. The scheduler then selects one or more of the transmission elements for scheduling in a given one of the timeslots based on the one or more adjusted channel capacities. For example, the scheduler may select for scheduling in the given timeslot a particular one of the transmission elements having a highest adjusted channel capacity of adjusted channel capacities of the respective transmission elements.

In an illustrative embodiment, the transmission elements comprise respective queues, and the channel capacities are adjusted based on lengths of the corresponding queues. The amounts of data available to transmit in the corresponding transmission elements may thus be specified by respective queue lengths. As a more particular example, a given one of the channel capacities may be adjusted by setting the channel capacity to an equivalent channel capacity determined by taking the minimum of the given channel capacity and a corresponding queue length. If a given one of the transmission elements has a queue length which is greater than its corresponding channel capacity, its adjusted channel capacity may be set equal to the lesser of the channel capacity and a collective size of an integer number of enqueued packets of the transmission element.

Equivalent channel capacities or other adjusted channel capacities determined in the manner described above may be used in place of conventional channel capacities in any of a number of different scheduling algorithms, including, for example, the previously-noted Max C/I, Proportional Fairness or M-LWDF scheduling algorithms.

The scheduler in an illustrative embodiment may be implemented in a network processor integrated circuit or other processing device of the communication system, using a wide variety of different arrangements of scheduling circuitry.

DETAILED DESCRIPTION OF THE INVENTION

The invention will be illustrated herein in conjunction with exemplary wireless networks and other types of communication systems. The exemplary systems include respective schedulers configured in a particular manner in order to illustrate the techniques of the invention. It should be understood, however, that the invention is more generally applicable to any communication system scheduler in which it is desirable to provide improved throughput.

Figure 1:
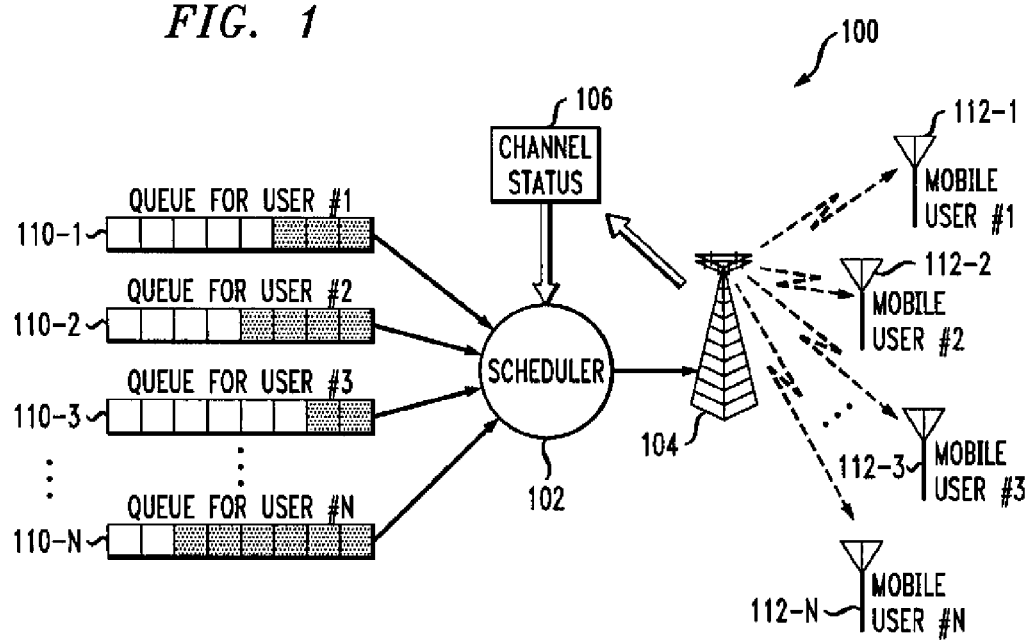
FIG. 1 is a simplified block diagram of a communication system comprising a wireless network in an illustrative embodiment of the present invention.

FIG. 1 shows a simplified diagram of a communication system 100 in accordance with an illustrative embodiment of the invention. The system 100 comprises a scheduler 102 coupled to a transmitter 104 and a channel status element 106. The scheduler is coupled to transmission elements which in this embodiment comprise respective queues 110-1, 110-2, . . . 110-N for respective ones of N users. In this example, the N users are mobile users of a wireless network of the system 100, and are associated with respective mobile user devices 112-1, 112-2, . . . 112-N which communicate with transmitter 104 in a conventional manner. The transmitter 104 may comprise, for example, at least a portion of a base station or access point of the wireless network.

The wireless network is configured for communication of packets or other arrangements of data between transmitter 104 and the mobile user devices 112. All such arrangements of data are intended to be encompassed by the general term "data block" as used herein. It is to be appreciated that the invention does not require any particular size or configuration of data blocks. For simplicity and clarity of illustration, the diagram shows only the downlink communication between transmitter 104 and the mobile user devices 112, although it is to be appreciated that similar techniques may be used for other types of transmission.

The system 100 in this embodiment maintains one queue 110 for each mobile user 112, although other types of queuing arrangements may be used. Downlink transmissions are assumed to occur in timeslots. The timeslots may be timeslots of a frame, but the invention does not require that the timeslots be timeslots of a frame. During each timeslot, the scheduler 102 serves one or more of the users. The scheduler in this embodiment is assumed to have knowledge of the wireless channel capacities associated with the respective mobile users. This knowledge may be provided to the scheduler by the channel status element 106, or using other techniques. As indicated previously, the channel capacities associated with the mobile users are typically time varying and difficult to predict. The scheduler bases its scheduling decisions on the actual measured channel conditions and other parameters, as will be described in greater detail below in conjunction with FIGS. 3 through 5. For a given timeslot, the scheduler selects one or more of the user queues 110 which will each be scheduled to transmit a packet during that timeslot. A given packet is transmitted via transmitter 104 to the corresponding one of the mobile user devices 112.

Figure 2:
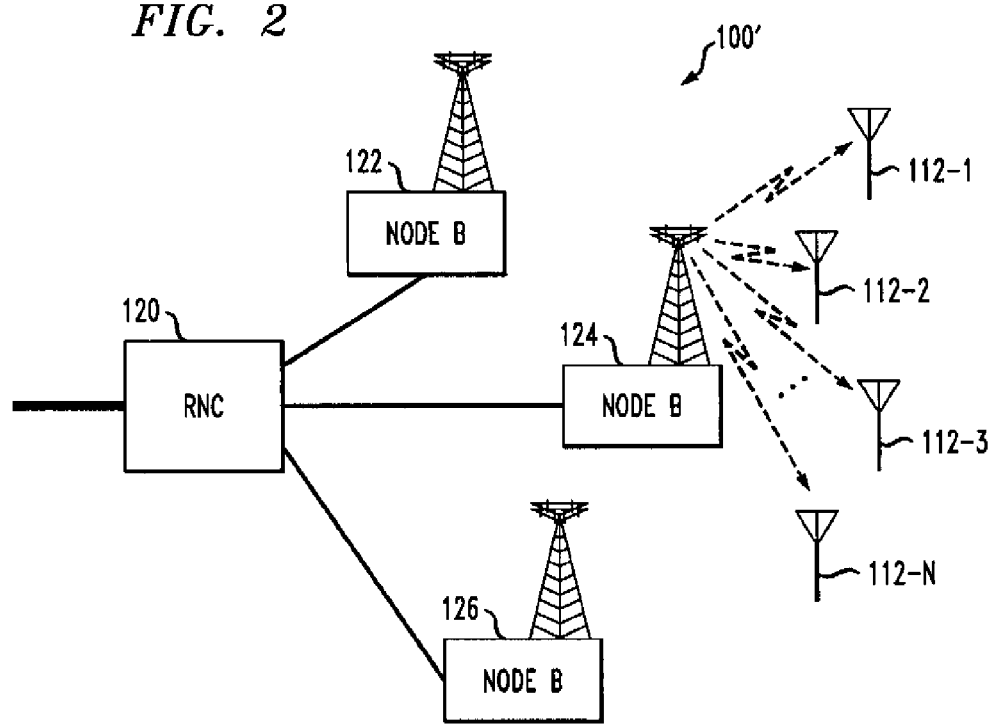
FIG. 2 shows one possible implementation of at least a portion of the communication system of FIG. 1.

The system 100 of FIG. 1 may be implemented, for example, as an otherwise conventional Universal Mobile Telecommunications System (UMTS) or Wideband Code Division Multiple Access (WCDMA) wireless cellular communication system. In such an implementation, system 100' as shown in FIG. 2 comprises a radio network controller (RNC) 120 coupled to base stations 122, 124 and 126 as shown. The base stations 122, 124 and 126 are referred to as Node B elements in accordance with well-known UMTS and WCDMA nomenclature. These elements communicate with the mobile user devices 112, which are referred to as user equipment (UE) elements in the UMTS and WCDMA context. The scheduler 102 and channel status element 106 of the FIG. 1 system may be incorporated in the RNC 120, or may be replicated in each of the Node B elements 122, 124 and 126. For example, if the UMTS or WCDMA system 100' is configured to provide high speed downlink packet access (HSDPA) capability, a scheduler is typically arranged in each Node B element so as to permit fast scheduling.

The above-noted HSDPA capability uses timeslots referred to as transmission time intervals (TTIs), and one or more users can be served within each TTI. The HSDPA feature can be provided in a frequency division duplex (FDD) mode or a time division duplex (TDD) mode. In the FDD mode, a given TTI has a duration of 2 milliseconds (ms), while in the TDD mode, a given TTI could be 5 ms or 10 ms. These and other TTIs are intended to be encompassed by the general term "timeslot" as used herein.

In the UMTS or WCDMA context, the communication system channel typically used in HSDPA to send data to the UEs from a given Node B is referred to as the high speed downlink shared channel (HS-DSCH).

For simplicity and clarity of illustration, the scheduler 102 as described below will be assumed to serve a single user per times lot, but it should be understood that the described techniques can be extended in a straightforward manner to accommodate HSDPA and other arrangements in which multiple users can be scheduled in a single timeslot.

It should also be pointed out that the particular arrangements of elements shown in FIGS. 1 and 2 are by way of illustrative example only. More specifically, as previously noted, the invention can be implemented in any type of wireless network or other communication system, and is not limited to any particular communication application.

The scheduler 102 is configured to schedule packets or other data blocks for transmission from the user queues 110 in timeslots. In scheduling for a given timeslot, the scheduler determines what are referred to herein as "equivalent channel capacities" for respective ones of the user queues 110 that are eligible to transmit one or more data blocks. An equivalent channel capacity may be viewed as an example of what is more generally referred to herein as an adjusted channel capacity. In operation, channel capacities are determined for respective ones of the user queues 110, and one or more of those channel capacities are then adjusted based on amounts of data available to transmit in the corresponding user queues. One or more of the user queues are then selected for scheduling in a given one of the timeslots based on the adjusted channel capacities.

In the illustrative embodiment, the amounts of data available to transmit in the corresponding queues are specified by respective queue lengths. Thus, a given one of the channel capacities may be adjusted by setting the channel capacity to an equivalent channel capacity determined by taking the minimum of the given channel capacity and a corresponding queue-based measure, such as queue length or queue length per timeslot. The scheduler 102 may then select for scheduling in the given timeslot, for example, a particular one of the user queues having a highest adjusted channel capacity of adjusted channel capacities of the respective user queues.

This scheduling approach based on adjusted channel capacities advantageously overcomes a significant problem of conventional scheduling algorithms that base their scheduling decisions at least in part on channel capacities.

Many conventional schedulers, such as the above-noted Max C/I, Proportional Fairness and M-LWDF schedulers, based their scheduling decisions at least in part on channel capacities. Typically, users with higher channel capacities have a better chance to be selected. However, when a given user has a high channel capacity but its corresponding queue is very short, the channel capacity of that user will not be fully utilized. Thus, the overall throughput of the system can be adversely impacted if such a user is selected by the scheduler.

As a more particular example, consider a typical HSDPA implementation having a maximum rate of 14.4 Mbps. In FDD mode, one slot is 2 ms, so the maximum channel capacity for a given slot is 14.4 Mbps*2 ms=28,800 bits=3,600 bytes. Thus, up to 3,600 bytes can be transmitted during one slot. If a user is selected that has a queue length much lower than 3,600 bytes, then bandwidth will be wasted.

The illustrative embodiment overcomes this significant problem associated with conventional schedulers by determining the above-noted adjusted channel capacities for the N user queues of the system 100. The equivalent channel capacities are determined, and then used in place of the regular channel capacities in the scheduling algorithm. The operation of the scheduling algorithm, which may be, for example, Max C/I, Proportional Fairness, M-LWDF or another scheduling algorithm, may be otherwise unchanged.

A more particular example of such a modified scheduling algorithm will be described below in conjunction with the flow diagrams of FIGS. 3 and 4.

The scheduler 102 may be implemented at least in part in the form of an integrated circuit, as will be described in greater detail elsewhere herein. Such an integrated circuit may comprise a network processor or other type of processor or processing device that is implemented in a given communication system element, such as a base station or access point associated with transmitter 104 in the FIG. 1 system, or an RNC or Node B element in the FIG. 2 system.

The scheduler 102 may be, for example, a frame mapping scheduler, of the type described in the above-cited U.S. patent application Ser. Nos. 10/903,954 and 10/998,686. The use of these techniques can substantially reduce the amount of memory required to store a mapping table for a golden ratio policy or any other policy that requires a stored mapping table.

It should be noted that the scheduling techniques of the present invention may also or alternatively be used in conjunction with a flexible scheduler architecture capable of supporting multiple scheduling algorithms, such as that disclosed in the above-cited U.S. patent application Ser. No. 10/722,933.

Figure 3:
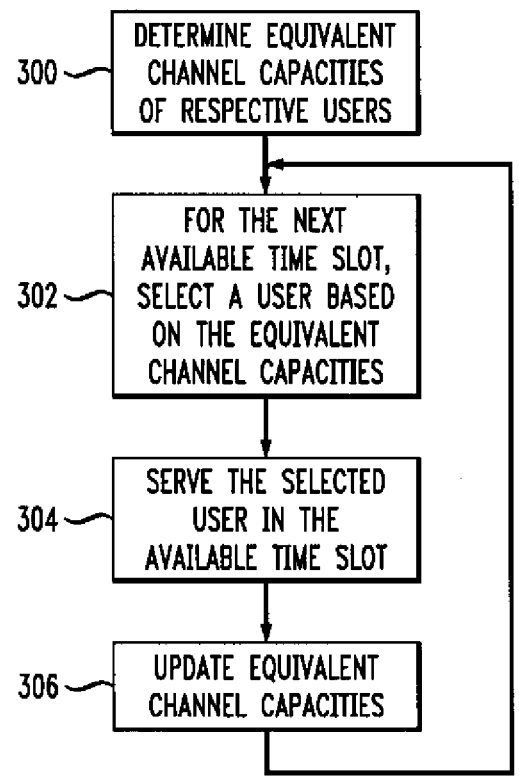
FIG. 3 is a flow diagram of a scheduling algorithm implemented in a scheduler of the FIG. 1 communication system in one embodiment of the present invention.

Referring now to FIG. 3, the operation of an exemplary scheduling algorithm, as implemented by scheduler 102 in system 100 of FIG. 1, is shown. This scheduling algorithm can provide better throughput than conventional Max C/I, Proportional Fairness or M-LWDF schedulers that utilize channel capacities in their scheduling decisions. In this version, the timeslots are assumed to be entirely independent and not part of a frame, although other embodiments can use timeslots of a frame.

In step 300, equivalent channel capacities are determined for respective users. The user queues 110 of the system 100 are referred to as "users" in the context of this example. One possible technique for determining adjusted channel capacities based on respective queue lengths will be described with reference to the flow diagram of FIG. 4.

In step 302, for the next available timeslot, the scheduler 102 selects a particular one of the N users based on the equivalent channel capacities. For example, the scheduler may select the user that has the maximum value of equivalent channel capacity among the N users. The available timeslot is also referred to herein as the current timeslot.

In these and other examples described herein, it is assumed for simplicity and clarity of illustration that all of the N users are backlogged at all times. Users are considered backlogged if they have at least one packet to transmit. With reference to the diagram of FIG. 1, it can be seen that each of the users illustrated, namely, users 1, 2, 3 and N, is backlogged in that each has at least one packet in its associated queue.

The foregoing backlogged user assumption, and other assumptions made herein, need not apply in other embodiments. For example, in alternative embodiments users that are not backlogged in the current timeslot may be removed from consideration in the scheduling process for that timeslot, as will be appreciated by those skilled in the art. However, it should be understood that users that are not backlogged in the current timeslot may become backlogged in the next timeslot, and so removing such users from consideration in scheduling the current timeslot should not be construed as removing them from consideration for other timeslots.

In step 304, the selected user is served in the available timeslot. The selected user is "served" in this example by scheduling a packet from the corresponding user queue 110 for transmission in the available timeslot.

In step 306, the equivalent channel capacities are updated after a particular one of the users has been selected for scheduling in the current timeslot.

After the updating of the equivalent channel capacities in step 306, the process returns to step 302 to determine the scheduling for the next timeslot.

Figure 4:
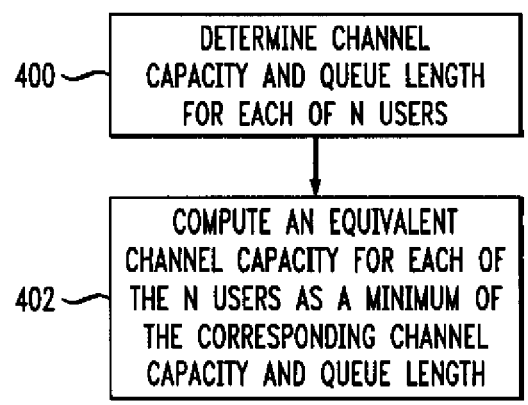
FIG. 4 is a flow diagram showing one technique for determining equivalent channel capacities in the scheduling algorithm of FIG. 3.

FIG. 4 illustrates one technique for determining the equivalent channel capacities of the N users in the FIG. 3 scheduling algorithm. In this technique, the channel capacity and queue length are determined for each of the N users, as indicated in step 400. Channel capacity may refer to any type of channel capacity measure, such as those conventionally used in typical implementations of the above-noted Max C/I, Proportional Fair and M-LWDF scheduling algorithms. The queue length is an example of what is more generally referred to herein as a queue-based measure, and in this embodiment generally refers to the length of the occupied portion of a given queue. That is, the length of the queue in terms of the data it contains, rather than in terms of its physical length or maximum capacity. It provides one type of indication of the amount of data available to transmit for the corresponding user, although other indicators of amounts of available data may be used in other embodiments.

In step 402, equivalent channel capacities are computed for each of the N users as a minimum of the corresponding channel capacity and queue length. Thus, for a given one of the N users, the equivalent channel capacity may be computed as:

equivalent_channel_capacity=min (channel_capacity, queue_length), where equivalent_channel_capacity and channel_capacity are specified in terms of bytes per slot and queue_length is specified in bytes. Thus, if the channel capacity of a given user is 3,600 bytes/slot and its queue length is 64 bytes, its equivalent channel capacity is 64 bytes/slot. A wide variety of alternative units and channel capacity measures can be used in other embodiments. For example, queue length may be specified in terms of bytes per slot, like channel capacity in the above equation. The equivalent capacity in this embodiment is thus computed as the minimum of the channel capacity in bytes per slot and the queue length in bytes or bytes per slot, with the result being expressed in bytes per slot.

It should be understood that the particular adjustment process of FIG. 4 and the particular equation given above are presented by way of illustrative example only, and numerous other techniques may be used to adjust the channel capacities based on respective amounts of data available to transmit.

Also, the term "channel capacity" as used herein is intended to be broadly construed. In certain of the examples described above, number of bytes per slot was used as an illustrative channel capacity, but any other measure indicative of the amount of data that can be carried by a channel may be used.

The scheduling algorithm of the illustrative embodiment of FIGS. 3 and 4 adjusts the channel capacities based on queue length to ensure that the users that are scheduled can make use of the bandwidth that is allocated to them. Such an algorithm provides improved throughput relative to conventional algorithms that base their decisions at least in part on channel capacities.

TABLE 1 below shows throughput performance for various scheduling algorithms, with and without the use of equivalent channel capacity. The throughput performance was determined by simulations involving N=400 users, an aggregate input rate that is 100% of line rate, and independent identically distributed traffic generators. The scheduling algorithms used were Max C/I, Proportional Fairness and M-LWDF. Implementations of these algorithms using conventional channel capacity provided throughput of 95.1%, 90.7% and 94.5%, respectively. Significant improvements can be seen based on the use of equivalent channel capacity as described above for each of the exemplary scheduling algorithms.

TABLE 1

Throughput Performance

| Scheduler | Throughput using conventional channel capacity | Throughput using equivalent channel capacity |
|---|---|---|
| Max C/I | 95.1% | 98.6% |
| Proportional Fairness | 90.7% | 96.5% |
| M-LWDF | 94.5% | 96.8% |

The above-described illustrative embodiment assumes for simplicity and clarity of description that a user can transmit any integer number of bytes within the channel capacity during one slot. A byte is considered a type of data block as the latter term is used herein. In certain implementations, one may only be able to transmit integer numbers of packets, cells or other data blocks each containing multiple bytes. For example, assume that a queue in an implementation of this type contains two 64-byte packets, such that the total queue length is 128 bytes. If the channel capacity is 100 bytes, the equivalent channel capacity should be 64 bytes, instead of 100 bytes, since a part of a packet cannot be transmitted. In such an embodiment, if the queue length is less than or equal to the channel capacity, the equivalent channel capacity may be determined by setting it equal to the queue length. Otherwise, the equivalent channel capacity is determined by summing the packets in the queue while the equivalent channel capacity remains less than or equal to the channel capacity.

An exemplary set of pseudocode for computing the equivalent channel capacity for a given user in the manner described above is as follows:

```
IF queue_length<=channel_capacity
    THEN equivalent_channel_capacity = queue_length
ELSE
    equivalent_channel_capacity = SUM of packets in the queue
        WHILE equivalent_channel_capacity <= channel_capacity
```

In embodiments in which the channel capacity is much larger than the maximum packet size, selecting the minimum of the channel capacity and the queue length as previously described will provide a good approximation to the result achieved by the above pseudocode.

A scheduling algorithm of the type described above may be implemented at least in part in the form of one or more software programs running on a network processor or other type of processing device.

When two or more users are determined by the scheduler 102 to have the same equivalent channel capacities in step 302 of FIG. 3, the tie can be broken randomly, or the user with the smaller index i can be selected, where i=1, 2, ... N. Another technique for dealing with such ties, suitable for use in the above-noted HSDPA context or other contexts in which multiple users can be served in a given timeslot, is to serve the users simultaneously in the given timeslot, as will now be described with reference to FIG. 5.

Figure 5:
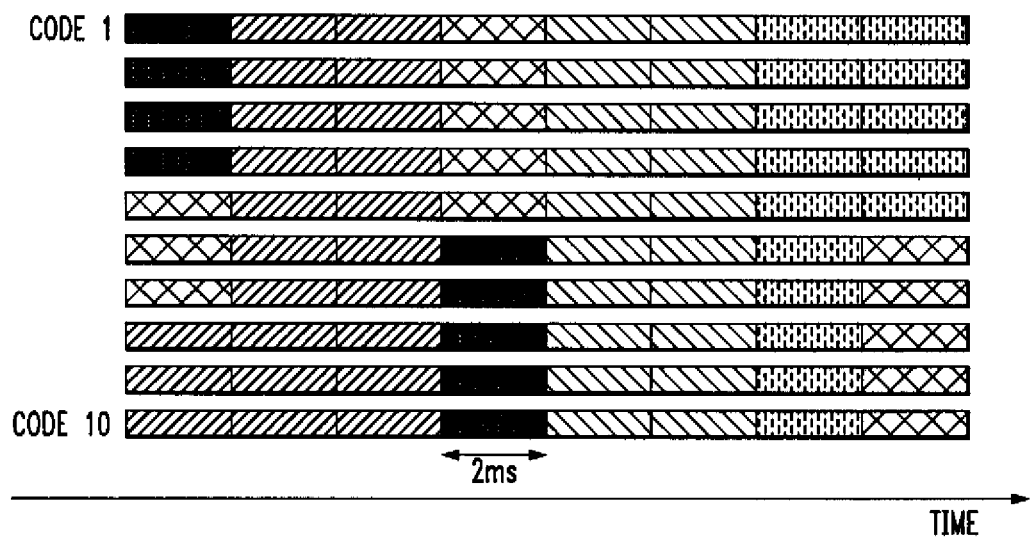
FIG. 5 is a table which shows an example of the operation of the scheduling algorithm of FIG. 3 in an HSDPA application.

FIG. 5 shows an example of scheduling of multiple users in each of a number of different HSDPA timeslots. In this example, the set of available codes comprises a set of ten codes, denoted Code 1 through Code 10. Each timeslot comprises an FDD mode TTI having a duration of 2 ms. Different shadings in the figure represent different users. Up to ten different users can be scheduled in a given one of the timeslots, by assigning one or more of the codes to each of the users.

It should be noted that the particular number of codes used in this example is for purposes of illustration only, and more or fewer codes may be used in other embodiments. As indicated above, the HS-DSCH channel is typically used in HSDPA to send data to the mobile users from a given Node B. Up to fifteen codes may be assigned to this channel. Thus, the ten codes shown in FIG. 5 represent just one example of a set of codes that may be used.

In the first timeslot shown in the figure, three users are scheduled, one assigned four codes and two others assigned three codes each. In the second and third timeslots, only a single user is scheduled, and is assigned all ten codes in each timeslot. In the fourth timeslot, two users are scheduled, with each assigned five of the ten available codes. The remaining timeslots shown are scheduled in a similar manner.

The scheduling of multiple users in a single timeslot as described above can be applied in contexts other than HSDPA, and may be implemented using other arrangements of timeslots and codes.

In a typical wireless network, mobile users are frequently removed from or added to a network or a particular cell or other coverage area of the network. The scheduler 102 may be configured to handle users removed or added, during a given frame or otherwise. For users that are removed, the scheduler can simply designate those users as ineligible or otherwise eliminate the users from consideration in the scheduling process. For new users that are added, the scheduler can, by way of example, wait until a new frame starts before making those users eligible, or otherwise adjust eligibility status of the new users.

As indicated previously, the scheduling algorithms described herein can be implemented in many other types of communication systems. Another example system will now be described with reference to FIGS. 6 through 8. In these figures, a scheduling algorithm is implemented in a scheduler of a network processor. Such a network processor may be used in systems comprising wireless networks as shown in FIGS. 1 and 2, but can also be used in other types of systems, such as the communication system 600 shown in FIG. 6.

The system 600 includes a network processor 602 having an internal memory 604. The network processor 602 is coupled to an external memory 606 as shown, and is configured to provide an interface for communicating packets or other arrangements of data between a network 608 and a switch fabric 610. As noted previously, all such arrangements of data are intended to be encompassed by the general term "data block" as used herein. The network 608 may be a wireless network, corresponding to a portion of one of the wireless networks in the systems of FIGS. 1 and 2, while the network processor 602 and switch fabric 610 may be implemented in base stations, network controllers or other elements of such systems.

The network processor 602 and its associated external memory 606 may be implemented, e.g., as one or more integrated circuits installed on a line card or port card of a router, switch or other system element.

Figure 6:
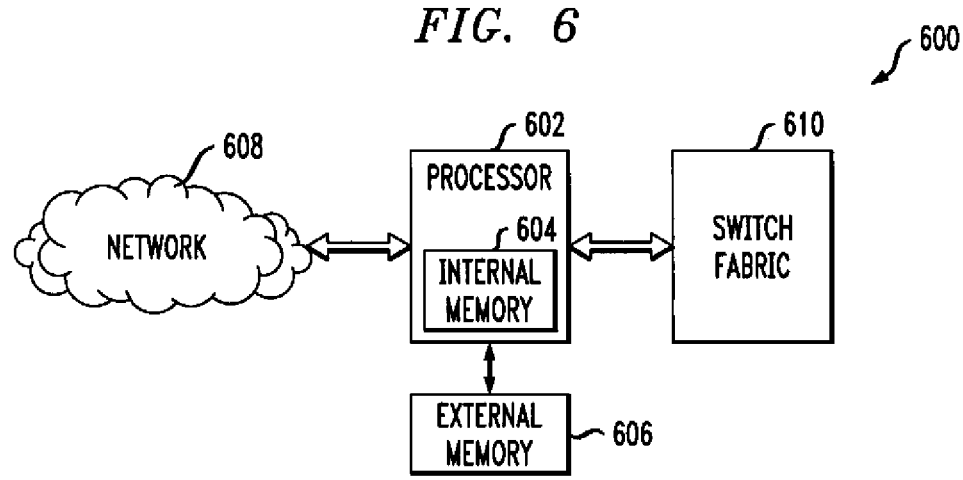
FIG. 6 shows another possible implementation of at least a portion of the FIG. 1 communication system.
Figure 7:
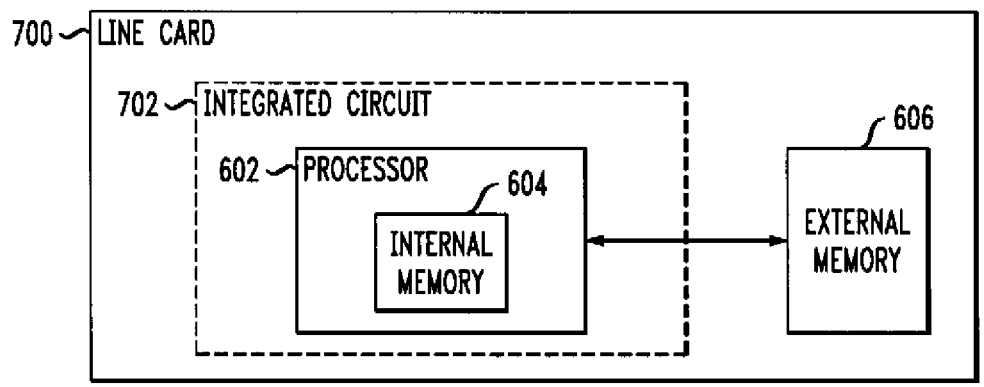
FIG. 7 is a block diagram of a network processor of the FIG. 6 system shown as an integrated circuit installed on a line card of a router or switch.

FIG. 7 illustrates an example line card embodiment of a portion of the system 600 of FIG. 6. In this embodiment, the system comprises a line card 700 having at least one integrated circuit 702 installed thereon. The integrated circuit 702 comprises network processor 602 which has internal memory 604. The network processor 602 interacts with external memory 606 on the line card 700. The external memory 606 may serve, e.g., as an external static random access memory (SRAM) or dynamic random access memory (DRAM) for the network processor integrated circuit 702. Such memories may be configured in a conventional manner. A suitable host processor may also be installed on the line card 700, and used for programming and otherwise controlling the operation of one or more network processor integrated circuits on the line card 700.

The portion of the communication system as shown in FIGS. 6 and 7 is considerably simplified for clarity of illustration. It is to be appreciated, however, that the system may comprise a router, switch or other element which includes multiple line cards such as that shown in FIG. 7, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 6 and 7 are by way of illustrative example only. More specifically, as previously noted, the invention can be implemented in any type of processor or other communication system processing device, and is not limited to any particular network-based processing application.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

Also, the system 600 and network processor 602 as illustrated in FIGS. 6 and 7 may include other elements in addition to or in place of those specifically shown, including one or more elements of a type commonly found in a conventional implementation of such a system and network processor. For example, the network processor may include a classifier, queuing and dispatch logic, one or more memory controllers, interface circuitry for interfacing the network processor with the network 608, the switch fabric 610, a host processor or other external device(s), as well as other conventional elements not explicitly shown in the figure. These and other conventional elements, being well understood by those skilled in the art, are not described in detail herein.

The functionality of the network processor 602 as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. For example, information characterizing particular scheduling algorithms, or associated traffic shaping information, may be supplied to the network processor from the associated host processor or other suitable mechanism.

Figure 8:
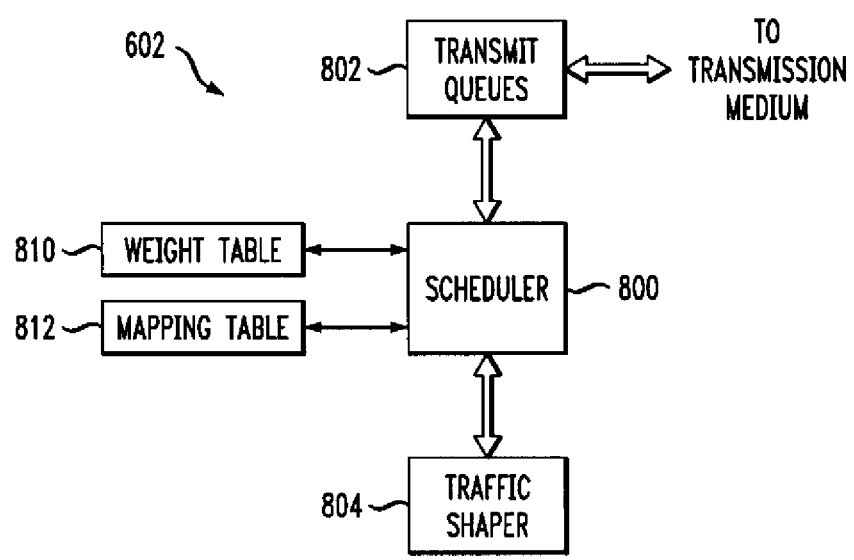
FIG. 8 is a more detailed view of a network processor of the FIG. 6 system configured in accordance with the techniques of the invention.

FIG. 8 shows a more detailed view of the network processor 602 in an illustrative embodiment of the invention. The network processor 602 in this embodiment includes a scheduler 800, transmit queues 802, a traffic shaper 804, a weight table 810, and a mapping table 812. In operation, the scheduler 800 schedules data blocks associated with the transmit queues 802 for transmission over one or more transmission media which are not explicitly shown. The scheduling utilizes the weight table 810 and mapping table 812, in conjunction with traffic shaping information from the traffic shaper 804 or without such information, in scheduling the data blocks associated with the transmit queues 802 for transmission.

As indicated previously, the network processor 602 may include additional elements, for example, of a type described in the above-cited U.S. patent applications, or of a conventional type known to those skilled in the art, and such elements, being described elsewhere, are not further described herein.

The weight table 810 and mapping table 812 may be stored at least in part in the internal memory 604 of the network processor 602, and may also or alternatively be stored at least in part in the external memory 606 of the network processor 602. When stored using internal memory, at least a portion of such memory may be internal to the scheduler 800 or other scheduling circuitry.

In addition to the table elements 810 and 812, scheduler 800 may include or otherwise have associated therewith a number of additional timeslot tables or other types of table elements suitable for use in static or dynamic table-based scheduling of a type described in the above-cited U.S. patent applications, or of a type known in conventional practice.

The transmit queues 802 may be viewed as comprising a plurality of transmission elements. For example, the transmit queues may comprise a plurality of transmission queues and associated control logic, with each of the transmission queues corresponding to a transmission element. It should be noted, however, that the term "transmission element" as used herein is intended to be construed more generally so as to encompass any source of one or more data blocks, or other elements that are schedulable for transmission in the network processor 602.

Packets or other data blocks can be enqueued in transmission elements of the transmit queues 802 from an associated network processor data path, not explicitly shown in the figure. This may occur in conjunction with packet enqueue messages and associated data blocks received from such a data path. Similarly, packets or other data blocks can be dequeued from the transmission elements to the data path upon transmission, for example, in conjunction with packet dequeue messages and associated data blocks being sent to the data path.

The traffic shaper 804 may be implemented, by way of example, as an otherwise conventional traffic shaping engine which establishes one or more traffic shaping requirements, in a known manner, for the transmission of the data blocks from the transmission elements of the transmit queues 802. The traffic shaper 804 may receive information regarding queue and scheduler status from the transmit queues 802 via the scheduler 800. The traffic shaper may generate traffic shaping information such as queue transmission interval and prioritization for establishing a class of service (CoS) or other desired service level for one or more of the transmission elements or their corresponding network connections.

As indicated above, in the network processor context the transmission elements, that is, the entities to be scheduled, may comprise queues. The present invention, however, can be used to schedule any type of elements for which data blocks are to be transmitted, and more generally any type of schedulable elements in a communication system processing device. Such elements are intended to be encompassed by the general term "transmission elements" as used herein, and may also be referred to herein as "users."

The scheduler 800 in the FIG. 8 embodiment is configured to implement a scheduling algorithm such as the above-described scheduling algorithms which utilize equivalent channel capacity.

The schedulers 102 and 800 are illustrative examples of what is referred to more generally herein as "scheduling circuitry." In other embodiments, scheduling circuitry may include one or more tables or other arrangements of one or more of hardware, software and firmware capable of implementing the scheduling techniques described herein. Thus, although shown as separate from the scheduler 800 in the figure, the weight table 810 and the mapping table 812 or suitable portions thereof may be at least partially incorporated into scheduling circuitry or an associated memory in accordance with the invention.

The schedulers 102 and 800 may utilize any arrangement of logic gates, processing elements or other circuitry capable of providing scheduling functionality of the type described herein. Scheduling circuitry in accordance with the invention may thus comprise otherwise conventional general-purpose network processor circuitry which is adaptable under software control to provide at least a portion of a scheduling function in accordance with the invention. Numerous such circuitry arrangements will be readily apparent to those skilled in the art, and are therefore not described in detail herein.

As indicated above, a given embodiment of the present invention can be implemented as one or more integrated circuits. In such an arrangement, a plurality of identical die is typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiment of FIG. 8 utilizes a scheduler which is separate from its associated table or tables, these elements or portions thereof may be incorporated into scheduling circuitry in accordance with the invention. Similarly, although transmit queues 802 and traffic shaper 804 are described as being separate from scheduler 800 in conjunction with the FIG. 8 embodiment, the associated functionality may be implemented at least in part within scheduling circuitry in accordance with the invention. Other embodiments can use different types and arrangements of processing elements for implementing the described functionality. For example, tables may be implemented in internal memory, external memory or combinations of internal and external memory. In the case of internal memory, at least a portion of such memory may be internal to the scheduling circuitry. A variety of different types of equivalent channel capacities, or more generally adjusted channel capacities, may be used, other than the particular example shown in FIG. 4. Also, a wide variety of different scheduling policies can be supported. These and numerous other alternative embodiments within the scope of the following claims will be apparent to those skilled in the art.

What is claimed is:

1. A method for scheduling data blocks for transmission from a plurality of transmission elements in timeslots in a communication system, the method comprising:
   determining for the transmission elements respective channel capacities;
   adjusting one or more of the channel capacities based on amounts of data available to transmit in the corresponding transmission elements; and
   selecting one or more of the transmission elements for scheduling in a given one of the timeslots based on the one or more adjusted channel capacities;
   wherein a given one of the one or more adjusted channel capacities is computed at least in part by comparing a corresponding determined channel capacity and an amount of data available to transmit in the corresponding transmission element.

2. The method of claim 1 wherein the transmission elements comprise respective queues.

3. The method of claim 2 wherein the adjusting step further comprises adjusting one or more of the channel capacities based on lengths of the corresponding queues.

4. The method of claim 1 wherein the determining, adjusting and selecting steps are repeated for one or more additional timeslots.

5. The method of claim 1 wherein the selecting step comprises selecting for scheduling in the given timeslot a particular one of the transmission elements having a highest adjusted channel capacity of adjusted channel capacities of the respective transmission elements.

6. The method of claim 1 wherein the amounts of data available to transmit in the corresponding transmission elements are specified by respective queue lengths.

7. The method of claim 1 wherein a given one of the channel capacities is adjusted by setting the channel capacity to an equivalent channel capacity determined by taking the minimum of the given channel capacity and a corresponding queue-based measure.

8. The method of claim 7 wherein the queue-based measure comprises a queue length.

9. The method of claim 7 wherein the queue-based measure comprises a queue length per timeslot.

10. The method of claim 7 wherein the queue-based measure is determined from an integer number of packets within the corresponding queue, the integer number of packets having a collective size less than the corresponding channel capacity.

11. The method of claim 1 wherein if a given one of the transmission elements has a queue length which is less than its corresponding channel capacity, its adjusted channel capacity is set equal to the queue length.

12. The method of claim 1 wherein if a given one of the transmission elements has a queue length which is greater than its corresponding channel capacity, its adjusted channel capacity is set equal to the lesser of the channel capacity and a collective size of an integer number of enqueued packets.

13. The method of claim 1 wherein the selecting step utilizes one of a maximum carrier to interference scheduling algorithm, a proportional fairness scheduling algorithm and a modified largest weighted delay first scheduling algorithm.

14. The method of claim 1 wherein two or more of the transmission elements are selected for scheduling in the given timeslot, said selected transmission elements all being scheduled in the given timeslot by assigning different subsets of a set of available codes to different ones of said selected transmission elements.

15. The method of claim 14 wherein the codes comprise HSDPA codes.

16. An apparatus for scheduling data blocks for transmission from a plurality of transmission elements in timeslots in a communication system, the apparatus comprising:
a scheduler coupled to the transmission elements;
wherein the scheduler is configured to determine for the transmission elements respective channel capacities, to adjust one or more of the channel capacities based on amounts of data available to transmit in the corresponding transmission elements, and to select one or more of the transmission elements for scheduling in a given one of the timeslots based on the one or more adjusted channel capacities; and
wherein a given one of the one or more adjusted channel capacities is a function of computed at least in part by comparing a corresponding determined channel capacity and an amount of data available to transmit in the corresponding transmission element.

17. The apparatus of claim 16 wherein the scheduler comprises scheduling circuitry implemented in a processing device of the communication system.

18. The apparatus of claim 16 wherein the processing device comprises a network processor integrated circuit.

19. An integrated circuit comprising:
a processing device having a scheduler configured to schedule data blocks for transmission from a plurality of transmission elements in timeslots in a communication system;
the scheduler being coupled to the transmission elements;
wherein the scheduler is configured to determine for the transmission elements respective channel capacities, to adjust one or more of the channel capacities based on amounts of data available to transmit in the corresponding transmission elements, and to select one or more of the transmission elements for scheduling in a given one of the timeslots based on the one or more adjusted channel capacities; and
wherein a given one of the one or more adjusted channel capacities is computed at least in part by comparing a corresponding determined channel capacity and an amount of data available to transmit in the corresponding transmission element.

20. The integrated circuit of claim 19 wherein the processing device comprises a network processor.

21. The integrated circuit of claim 19 further comprising memory circuitry associated with said processing device and adapted for storage of said one or more adjusted channel capacities.

22. The integrated circuit of claim 19 wherein the scheduler is implemented at least in part in the form of software running on the processing device.

23. A communication system comprising:
a base station comprising a plurality of transmission elements and a scheduler coupled to the transmission elements; and
a plurality of mobile user devices configured for communication with the base station;
wherein the scheduler of the base station is configured to schedule data blocks for transmission from the transmission elements to the mobile user devices in timeslots; and
wherein the scheduler of the base station is configured to determine for the transmission elements respective channel capacities, to adjust one or more of the channel capacities based on amounts of data available to transmit in the corresponding transmission elements, and to select one or more of the transmission elements for scheduling in a given one of the timeslots based on the one or more adjusted channel capacities; and
wherein a given one of the one or more adjusted channel capacities is computed at least in part by comparing a corresponding determined channel capacity and an amount of data available to transmit in the corresponding transmission element.

* * * * *